No. 882,028. PATENTED MAR. 17, 1908.
C. M. SWANSON.
LOOSE PULLEY.
APPLICATION FILED APR. 18, 1907.

Witnesses.
F. C. Dahlberg.
N. E. Bennett.

Inventor:
Carl M. Swanson.
by Orwig & Lane Atty,s

THE NORRIS PETERS CO., WASHINGTON, D. C.

UNITED STATES PATENT OFFICE.

CARL M. SWANSON, OF DES MOINES, IOWA.

LOOSE PULLEY.

No. 882,028.  Specification of Letters Patent.  Patented March 17, 1908.

Application filed April 18, 1907. Serial No. 368,823.

*To all whom it may concern:*

Be it known that I, CARL M. SWANSON, a citizen of the United States, residing at Des Moines, in the county of Polk and State of Iowa, have invented a certain new and useful Loose Pulley, of which the following is a specification.

The object of my invention is to provide a loose pulley of simple, durable and inexpensive construction, in which the body portion of the pulley may be readily and easily fixed to shafts of different diameters, and accurately centered thereon, and in which the rim only is moved by the belt, and in which the wear occasioned by the movement of the rim relative to the pulley body may be easily and quickly taken up, so that the rim may at all times freely rotate relative to the body, without having any appreciable amount of lateral motion.

My invention consists in the construction, arrangement and combination of the various parts of the pulley whereby the objects contemplated are attained, as hereinafter more fully set forth, pointed out in my claims, and illustrated in the accompanying drawings, in which—

Figure 1:
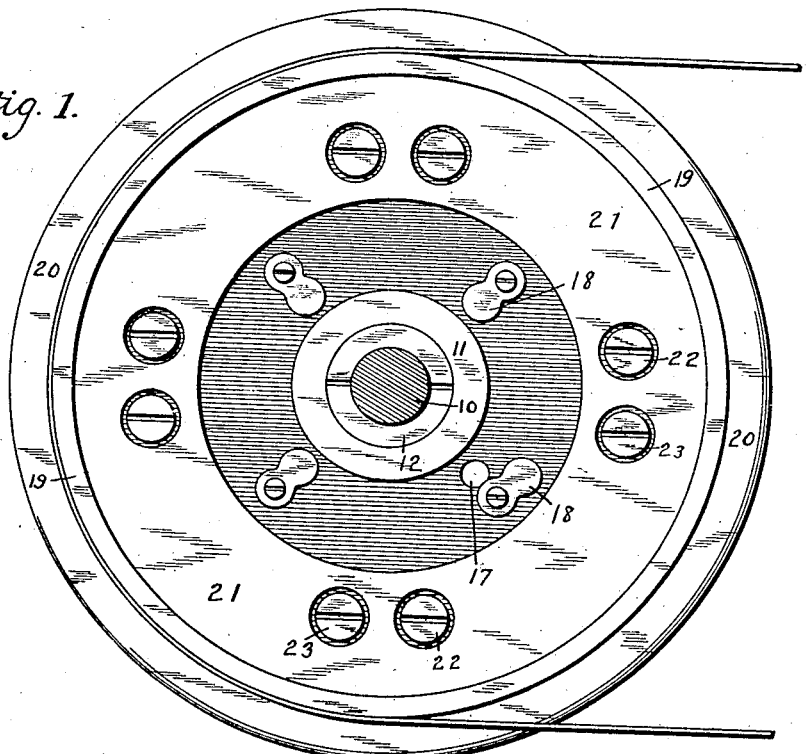
Figure 1 shows a face view of a pulley embodying my invention fixed to a shaft, and—
Figure 2:
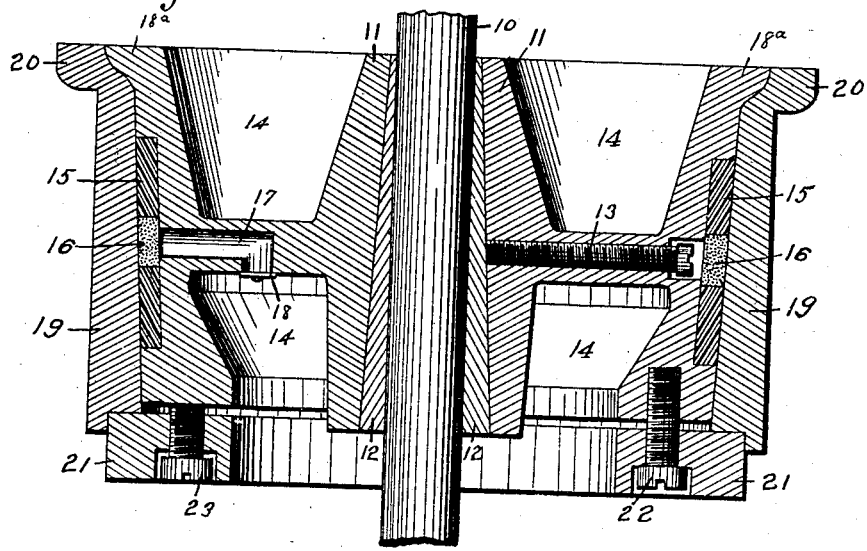
Fig. 2 shows a central sectional view of same.

Referring to the accompanying drawings, I have used the reference numeral 10 to indicate the shaft to which the pulley is attached. The body portion of the pulley is indicated by the numeral 11, and is provided with a central tapered opening to receive the shaft. Placed in this opening are two wedges 12, each semicircular in cross section, and tapered to fit the interior of the opening in the pulley. In this way, the pulley may be fitted to shafts of different sizes by forcing the wedges into the opening until they accurately fit the shaft. I also provide additional means for locking the wedges in position by means of a set screw 13, extended radially through the pulley body 11, and in engagement with the adjacent wedge 12. On both faces of the body portion 11, I have formed recesses 14, for the purpose of reducing the weight of said body portion. The periphery of the body portion is slightly tapered, and a groove is formed in the central portion of the periphery into which Babbitt metal 15 is placed, to form a good working face. In the center of the Babbitt metal I form a recess extending around the pulley body, into which a packing material 16 is placed. This packing material is for the purpose of containing a quantity of lubricating oil, the oil being fed to the packing through the openings 17, which openings are normally covered by the pivoted caps 18. At one edge of the periphery of the body portion 11, I have formed an annular rib $18^a$ for purposes hereinafter made clear.

The pulley working face or rim, is formed complete in one piece, and is cylindrical in shape. Its body portion is indicated by the numeral 19, and on its interior it is shaped to fit the rib $18^a$, and it is also tapered to fit the periphery of the body portion 11. Formed on one edge of its periphery, is an annular ring 20, and formed on the other edge of its periphery is an annular groove for purposes hereinafter made clear. This movable pulley member is placed upon the pulley body 11, and I provide for securing it in position thereon as follows: The numeral 21 indicates a circular rim designed to enter the annular groove formed in the part 19. I provide for rigidly connecting this rim with the body 11 by means of four set screws 22, extended through the rim and seated in the body portion 11, and I provide for spacing the rim 21 apart from the body portion 11 by means of four set screws 23, seated in the rim 21 to engage the adjacent face of the body portion 11. In this way I prevent the screws 22 from causing the rim 21 to bind against the movable pulley member 19, while the screws 22 serve to hold the rim 21 in its proper position with relation to the body portion 11.

In practical use, and assuming that it is desired to connect the pulley with the shaft, the rim 21 and the movable pulley member 19 are detached. If the shaft is comparatively large, then the wedges 12 will enter the tapered recess only part way, while if the shaft is small, they will project through beyond the pulley. If when both wedges are driven in an equal distance, the pulley is not perfectly centered upon the shaft, then one wedge may be driven further than the other, as required in centering. After the pulley is centered, the set screw 13 is tightened, then the movable pulley member is placed in position, the rib $18^a$ on the stationary member being provided to prevent the movable member from projecting beyond the stationary one. Then the circular adjusting rim 21 is fitted in position, and the set screws 23 are so adjusted as to permit the movable pulley member 19 to freely rotate without binding, then the set screws 22 are inserted to hold the rim 21 firmly to the pulley body 11. After wear has taken place, and the movable member 19 begins to have a slight lateral motion, then the screws 23 are slightly loosened, and the screws 22 tightened a corresponding amount, thus taking up the wear. By having Babbitt metal 15 provided as a working face between the stationary and movable pulley members, I avoid heating the parts when the movable pulley member is driven at high speed. The annular ring 20 on the movable pulley member is provided for directing a belt to pass from the loose pulley to a fixed pulley arranged adjacent to it.

Having thus described my invention, what I claim and desire to secure by Letters Patent of the United States, therefor is—

1. An improved loose pulley, comprising a stationary pulley body, having a tapered central opening, two tapered wedges, each semi-circular in cross section, inserted in the tapered opening, a set screw seated in the pulley body to engage one of said wedges, and a movable pulley member rotatably mounted on the stationary one.

2. In a loose pulley, the combination of a pulley body having its periphery of greater diameter at one end than the other, means for firmly connecting said pulley body with a shaft, a movable pulley member or sleeve mounted upon the pulley body and having its interior tapered to correspond with the pulley body, and an annular rim placed adjacent to the smaller end of the pulley body, said rim being of a size to engage the adjacent end of the movable pulley body, a number of set screws passed through the rim and seated in the pulley body, for adjustably holding the rim toward the pulley body for tightening the movable pulley member relative to the fixed one, and a number of set screws seated in the annular rim to engage the adjacent portion of the pulley body for normally holding the rim away from the pulley body to permit the movable pulley member to rotate freely relative to the pulley body.

CARL M. SWANSON.

Witnesses:
S. F. CHRISTY,
RALPH ORWIG.